(12) United States Patent
Dar et al.

(10) Patent No.: US 12,554,840 B2
(45) Date of Patent: Feb. 17, 2026

(54) SYSTEM AND METHOD FOR INTEGRATING MACHINE LEARNING OPTIMIZATIONS INTO A STORAGE SYSTEM DATAPATH

(71) Applicant: Dell Products L.P., Round Rock, TX (US)

(72) Inventors: Shaul Dar, Petach Tikva (IL); Vamsi Vankamamidi, Hopkinton, MA (US); Shuyu Lee, Acton, MA (US)

(73) Assignee: Dell Products L.P., Round Rock, TX (US)

( * ) Notice: Subject to any disclaimer, the term of this patent is extended or adjusted under 35 U.S.C. 154(b) by 206 days.

(21) Appl. No.: 18/425,127

(22) Filed: Jan. 29, 2024

(65) Prior Publication Data

US 2025/0245321 A1     Jul. 31, 2025

(51) Int. Cl.
*G06F 21/55* (2013.01)
*G06F 21/54* (2013.01)

(52) U.S. Cl.
CPC ............ *G06F 21/552* (2013.01); *G06F 21/54* (2013.01)

(58) Field of Classification Search
None
See application file for complete search history.

(56) References Cited

U.S. PATENT DOCUMENTS

| 2022/0075842 A1* | 3/2022 | Bhaskaracharya | G06N 3/09 |
| 2022/0291864 A1* | 9/2022 | Yang | G06F 3/061 |
| 2023/0123811 A1* | 4/2023 | Collins | G06F 8/443 706/17 |

* cited by examiner

*Primary Examiner* — Paul R Fisher
(74) *Attorney, Agent, or Firm* — Brian J. Colandreo; Heath M. Sargeant; Holland & Knight LLP (57) ABSTRACT

A method, computer program product, and computing system for processing a plurality of input/output (IO) requests on a storage object within a storage system datapath using a plurality of processing cores of a storage system. The plurality of IO requests are sampled from the plurality of processing cores. An IO feature matrix is generated using the periodically sampled IO requests. The IO feature matrix is provided to a machine learning model that is separate from the storage system datapath. A machine learning model inference result is generated by processing the IO feature matrix using the machine learning model. The machine learning model inference result is provided to the storage system datapath. A storage system policy is executed using the machine learning model inference result.

20 Claims, 5 Drawing Sheets

SYSTEM AND METHOD FOR INTEGRATING MACHINE LEARNING OPTIMIZATIONS INTO A STORAGE SYSTEM DATAPATH

BACKGROUND

The ability to model and characterize the input/output (IO) activity of storage objects (e.g., files, volumes, or extents) in a storage system, can enable many specialized optimizations and significant performance gains. For example, using domain-specific machine learning (ML) models can enable better tiering and caching in a storage system, identification of long-term archival candidate, and can also be leveraged to detect security threats such as a ransomware attack. This approach generally involves generating succinct traces of the IO requests occurring in the system, using them to engineer domain-specific IO-stream features, and then training a classification or regression model based on these features for the particular task at hand.

However, in a storage system comprising millions of storage objects, the cost of generating features and building a model (i.e., training) can be prohibitive, in terms of the memory footprint and CPU overhead when sampling each IO request. This approach presents multiple technical challenges, notably: 1) real-time collection of IO traces or samples; 2) the calculation and accumulation of large feature matrices for the relevant storage objects; 3) the communication between the storage system datapath and a machine learning model; and 4) the measuring and improving of the performance (e.g., accuracy) of the machine learning model based on feedback from the storage system. All of these actions must be done with acceptable computation and space overhead, (i.e., without negatively impacting the I/O processing performance (e.g., throughput and latency) of the storage system).

SUMMARY OF DISCLOSURE

In one example implementation, a computer-implemented method executed on a computing device may include, but is not limited to, processing a plurality of input/output (IO) requests on a storage object within a storage system datapath using a plurality of processing cores of a storage system. The plurality of IO requests are sampled from the plurality of processing cores. An IO feature matrix is generated using the periodically sampled IO requests. The IO feature matrix is provided to a machine learning model that is separate from the storage system datapath. A machine learning model inference result is generated by processing the IO feature matrix using the machine learning model. The machine learning model inference result is provided to the storage system datapath. A storage system policy is executed using the machine learning model inference result.

One or more of the following example features may be included. An analytics storage container may be generated using the periodically sampled IO requests. The IO feature matrix may be generated using the analytics storage container. Generating the machine learning model inference result may include generating a plurality of IO features from the IO feature matrix using the machine learning model. The machine learning model inference result may be synchronized across a pair of storage nodes of the storage system. Executing the storage system policy includes one or more of: forecasting a temperature value for the storage object using the machine learning model and the IO feature matrix; monitoring for a potential ransomware attack on a storage object using the machine learning model and the IO feature matrix; and tiering the storage object in a multi-tiered storage system using the machine learning model and the IO feature matrix. The machine learning model inference result may be persisted in the storage system. Feedback may be provided to the machine learning model.

In another example implementation, a computer program product resides on a computer readable medium that has a plurality of instructions stored on it. When executed by a processor, the instructions cause the processor to perform operations that may include, but are not limited to, processing a plurality of input/output (IO) requests on a storage object within a storage system datapath using a plurality of processing cores of a storage system. The plurality of IO requests are sampled from the plurality of processing cores. An IO feature matrix is generated using the periodically sampled IO requests. The IO feature matrix is provided to a machine learning model that is separate from the storage system datapath. A machine learning model inference result is generated by processing the IO feature matrix using the machine learning model. The machine learning model inference result is provided to the storage system datapath. A storage system policy is executed using the machine learning model inference result.

One or more of the following example features may be included. An analytics storage container may be generated using the periodically sampled IO requests. The IO feature matrix may be generated using the analytics storage container. Generating the machine learning model inference result may include generating a plurality of IO features from the IO feature matrix using the machine learning model. The machine learning model inference result may be synchronized across a pair of storage nodes of the storage system. Executing the storage system policy includes one or more of: forecasting a temperature value for the storage object using the machine learning model and the IO feature matrix; monitoring for a potential ransomware attack on a storage object using the machine learning model and the IO feature matrix; and tiering the storage object in a multi-tiered storage system using the machine learning model and the IO feature matrix. The machine learning model inference result may be persisted in the storage system. Feedback may be provided to the machine learning model.

In another example implementation, a computing system includes at least one processor and at least one memory architecture coupled with the at least one processor, wherein the at least one processor is configured to process a plurality of input/output (IO) requests on a storage object within a storage system datapath using a plurality of processing cores of a storage system. The plurality of IO requests are sampled from the plurality of processing cores. An IO feature matrix is generated using the periodically sampled IO requests. The IO feature matrix is provided to a machine learning model that is separate from the storage system datapath. A machine learning model inference result is generated by processing the IO feature matrix using the machine learning model. The machine learning model inference result is provided to the storage system datapath. A storage system policy is executed using the machine learning model inference result.

One or more of the following example features may be included. An analytics storage container may be generated using the periodically sampled IO requests. The IO feature matrix may be generated using the analytics storage container. Generating the machine learning model inference result may include generating a plurality of IO features from the IO feature matrix using the machine learning model. The machine learning model inference result may be synchronized across a pair of storage nodes of the storage system. Executing the storage system policy includes one or more of: forecasting a temperature value for the storage object using the machine learning model and the IO feature matrix; monitoring for a potential ransomware attack on a storage object using the machine learning model and the IO feature matrix; and tiering the storage object in a multi-tiered storage system using the machine learning model and the IO feature matrix. The machine learning model inference result may be persisted in the storage system. Feedback may be provided to the machine learning model.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
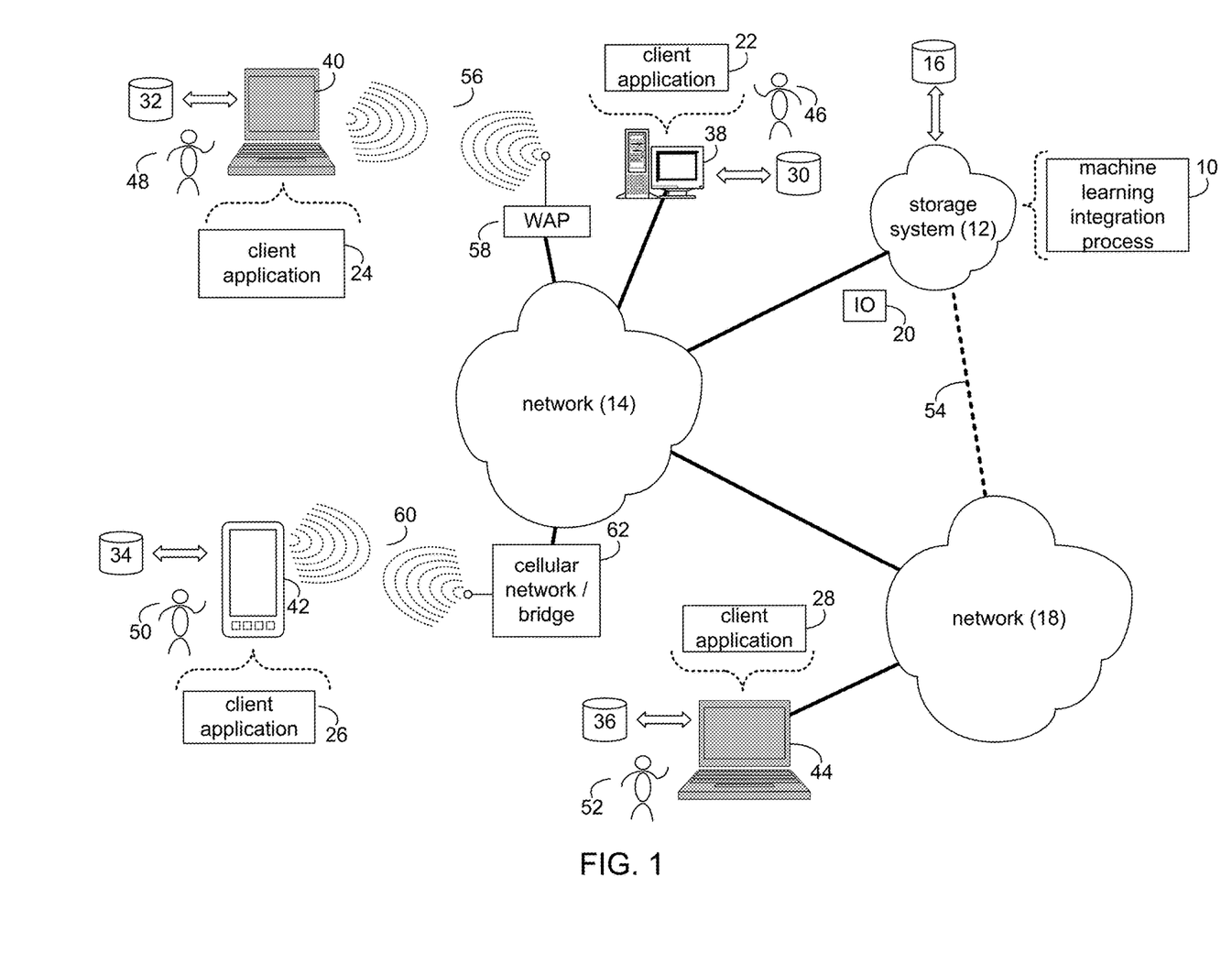
FIG. 1 is an example diagrammatic view of a storage system and a machine learning integration process coupled to a distributed computing network according to one or more example implementations of the disclosure.

System Overview:

Referring to FIG. 1, there is shown machine learning integration process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of machine learning integration process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of machine learning integration process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a machine learning integration process, such as machine learning integration process 10 of FIG. 1, may include but is not limited to, processing a plurality of input/output (IO) requests on a storage object within a storage system datapath using a plurality of processing cores of a storage system. The plurality of IO requests are sampled from the plurality of processing cores. An IO feature matrix is generated using the periodically sampled IO requests. The IO feature matrix is provided to a machine learning model that is separate from the storage system datapath. A machine learning model inference result is generated by processing the IO feature matrix using the machine learning model. The machine learning model inference result is provided to the storage system datapath. A storage system policy is executed using the machine learning model inference result.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
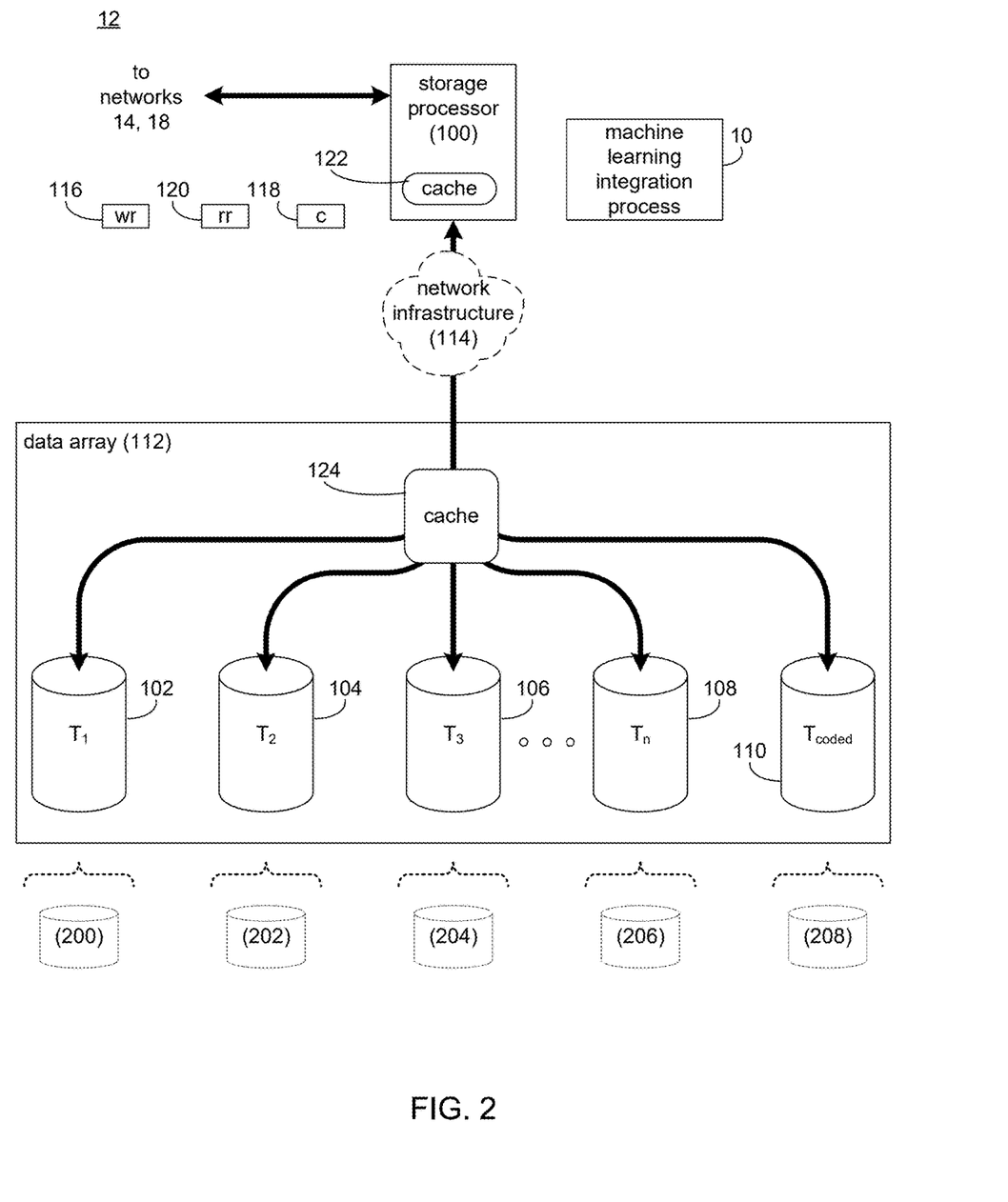
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of machine learning integration process 10. The instruction sets and subroutines of machine learning integration process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of machine learning integration process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g., one or more of storage targets 102, 104, 106, 108, and coded target 110.

As discussed above, the instruction sets and subroutines of machine learning integration process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of machine learning integration process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
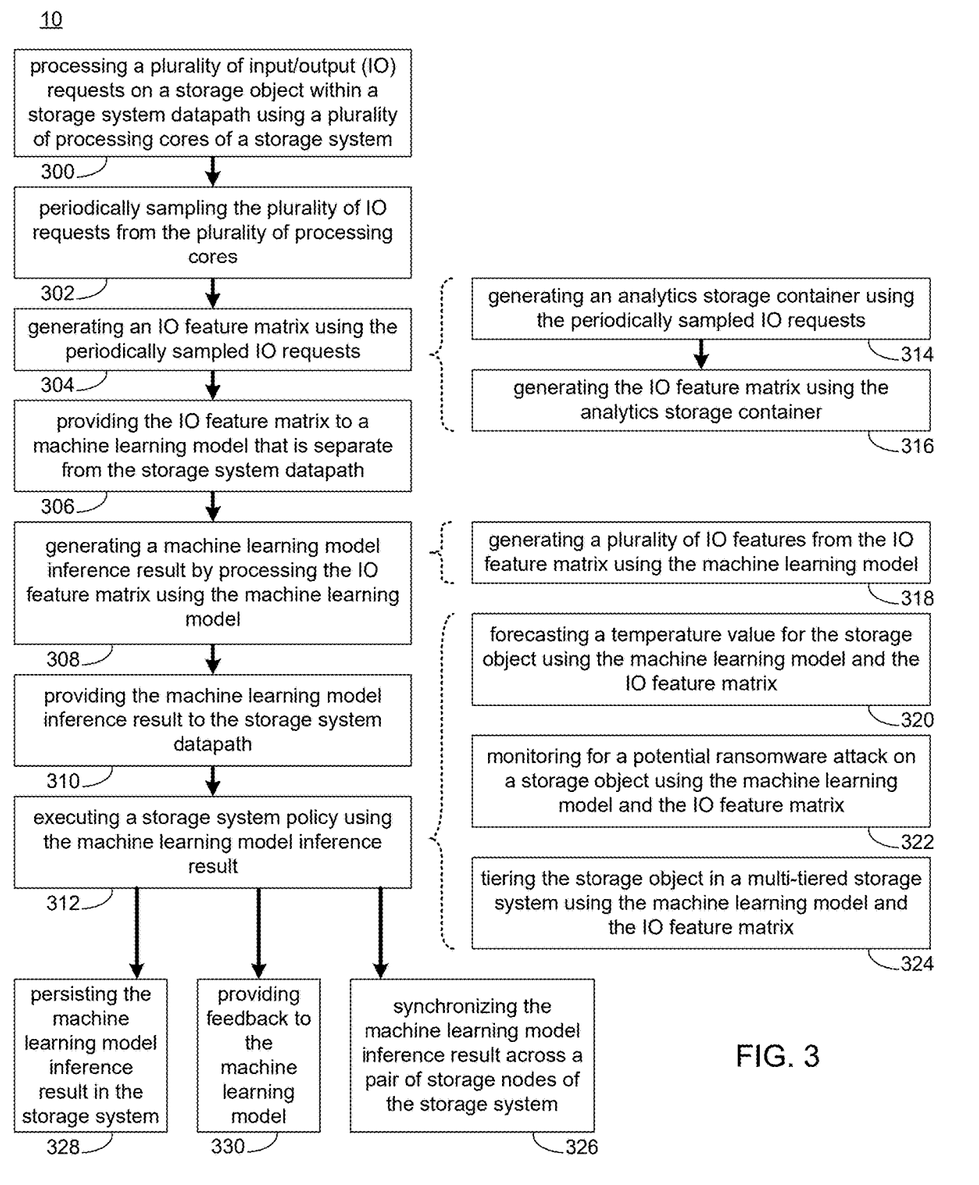
FIG. 3 is an example flowchart of machine learning integration process according to one or more example implementations of the disclosure.
Figure 4:
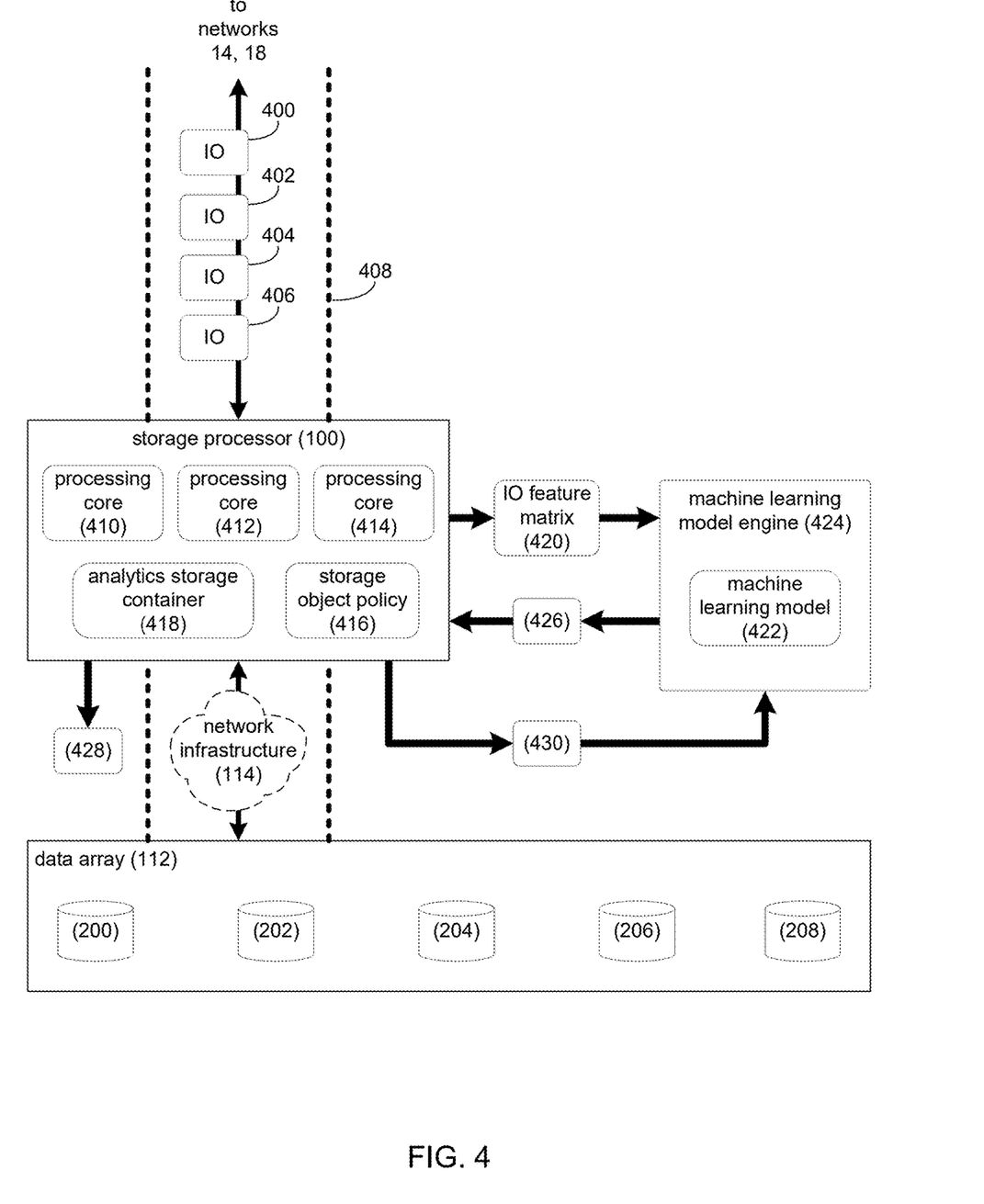
FIGS. 4-5 are example diagrammatic views of the machine learning integration process according to various example implementations of the disclosure.
Figure 5:
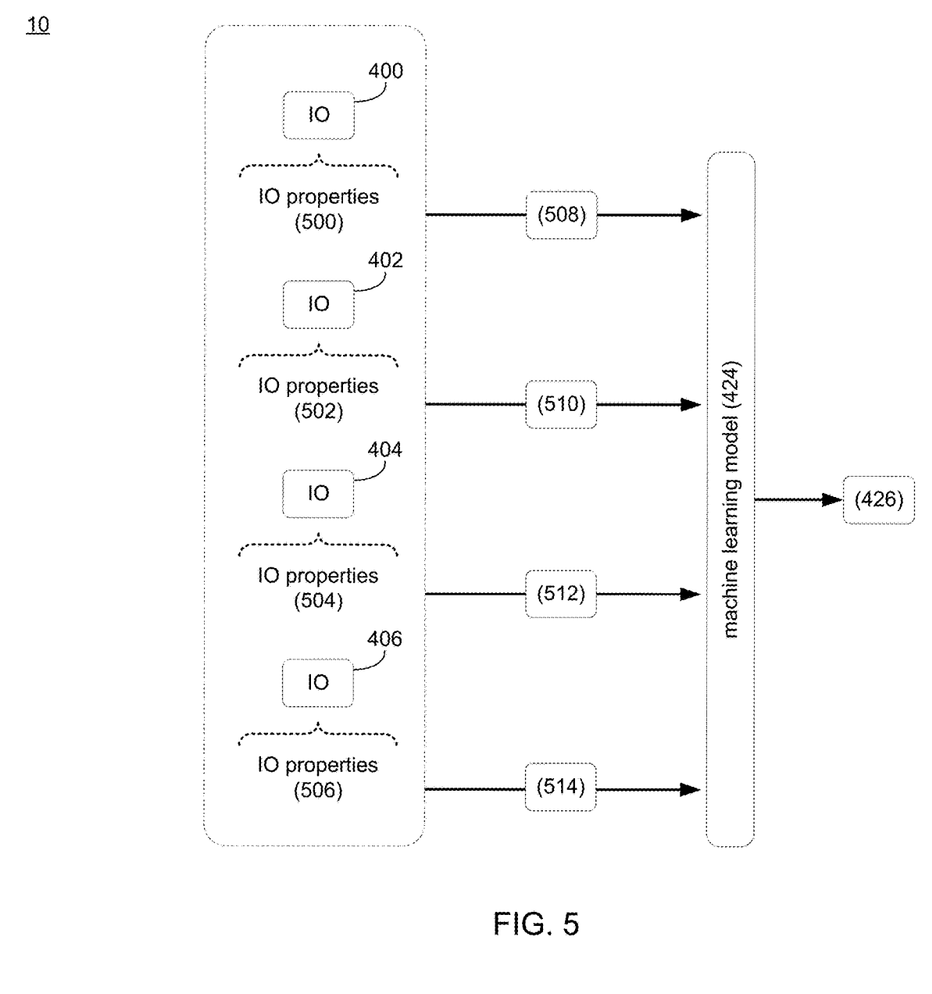

The Machine Learning Integration Process:

Referring also to the examples of FIGS. 3-5 and in some implementations, machine learning integration process 10 may process 300 a plurality of input/output (IO) requests on a storage object within a storage system datapath using a plurality of processing cores of a storage system. The plurality of IO requests are sampled 302 from the plurality of processing cores. An IO feature matrix is generated 304 using the periodically sampled IO requests. The IO feature matrix is provided 306 to a machine learning model that is separate from the storage system datapath. A machine learning model inference result is generated 308 by processing the IO feature matrix using the machine learning model. The machine learning model inference result is provided 310 to the storage system datapath. A storage system policy is executed 312 using the machine learning model inference result.

As will be discussed in greater detail below, implementations of the present disclosure may allow for integration of machine learning-based optimizations into the datapath IO processing of a storage system. For example, the ability to model and characterize the input/output (IO) request activity of objects such as files, volumes, or extents, in a storage system, can enable significant performance gains. For example, it can enable better tiering and caching in a storage system, assist in load balancing across a storage cluster, or help guide data placement and movement in a cloud or combined on-premises and cloud environment. It can also be leveraged to detect security threats such as a ransomware attack.

However, in a storage system comprising millions of storage objects, the cost of generating features and building a machine learning model (i.e., training) can be prohibitive, in terms of the memory footprint and central processing unit (CPU) overhead when sampling each IO request. Accordingly, implementations of the present disclosure allow for the integration of machine learning-based optimizations by generating IO features in the storage system datapath, providing these IO features to a machine learning model engine and processing the machine learning model result when executing a storage object policy within the storage system datapath. In this manner, machine learning integration process 10 samples IO requests in real-time during processing within the storage system datapath and provides these for parallel processing by a machine learning model.

In some implementations, machine learning integration process 10 processes 300 a plurality of input/output (IO) requests on a storage object within a storage system datapath using a plurality of processing cores of a storage system. A storage system datapath is the path data is processed along when performing IO requests. For example, when reading or writing data from an IO operation, the data is conveyed and processed using various hardware and software components. These hardware and software components define the storage system datapath. In some implementations, machine learning integration process 10 may process 300 a plurality of input/output (IO) requests for a storage object of a storage system. For example and referring again to FIG. 2, during the operation of a storage system (e.g., storage system 12), IO requests may be generated for processing data on various storage objects (e.g., storage objects 200, 202, 204, 206, 208). Storage objects (e.g., storage objects 200, 202, 204, 206, 208) may generally include any container or storage unit configured to store data within a storage system (e.g., storage system 12). For example, a storage object may be any one of the following: a volume (aka Logical Unit Number (LUN)), a file, or parts thereof that may be defined e.g., by offsets or address ranges (e.g., sub-LUNs, disk extents, and/or slices). In some implementations, the plurality of storage objects includes a block storage object and/or a file storage object. A block storage object is a block or chunk of storage that can be accessed by various operating systems. In some implementations, a file storage object is a folder or subset of a hierarchical data structure accessible by a particular path within the hierarchical data structure.

Referring also to FIG. 4, a plurality of IO requests (e.g., plurality of IO requests 400) may include e.g., IO requests associated with various storage objects and/or the same storage object. IO request 400 may represent any number of IO requests to perform a read IO operation on a first storage object (e.g., storage object 200); IO request 402 may represent any number of IO requests to perform a write IO operation on storage object 200; IO request 404 may represent any number of IO requests to perform a read IO operation on storage object 200; and IO request 406 may represent any number of IO requests to perform an operation on storage object 200. While four separate IO requests for a single storage object have been described, it will be appreciated that this is for example purposes only and that any number of IO requests may be received for any number of storage objects within the present disclosure.

As shown in FIG. 4, a storage system datapath (e.g., storage system datapath 408) includes the hardware and software components that convey IO requests 400, 402, 404, 406 from one or more host computing devices to a storage processor (e.g., storage processor 100) within storage system 12 and the hardware and software components that convey data between storage processor 100 and data array 112 to effectuate IO requests 400, 402, 404, 406 on storage objects 200, 202, 204, 206, 208. Storage system datapath 408 is shown with parallel dashed lines between host devices, storage processor 100, and data array 112. As shown in FIG. 4, storage processor 100 includes a plurality of processing cores (e.g., processing cores 410, 412, 414). While FIG. 4 includes e.g., three processing cores, it will be appreciated that this is for example purposes only and that any number of processing cores may be deployed within a storage processor within the scope of the present disclosure. A processing core is a processing unit that performs operations on data. By using multiple, separate processing cores, storage processor 100 is able to process multiple IO requests at one time, or at least partially process multiple IO requests at one time.

In conventional processing approaches, storage processor 100 would use the plurality of processing cores (e.g., processing cores 410, 412, 414) and a storage object policy (e.g., storage object policy 416) to determine how to process IO requests 400, 402, 404, 406 on storage objects 200, 202, 204, 206, 208. Storage object policy 416 may include various policies, thresholds, or other metrics that manage storage processor 100 and/or data array 112 performance. For example, storage object policy 416 may define when a storage object is tiered within a particular tier of a multi-tiered storage system. In another example, storage object policy 416 may define a threshold for storing data within a high-performance storage device versus a lower performance storage device. In some implementations, storage object policy 416 is influenced or modified by the results of a machine learning model that forecasts particular performance characteristics associated with the storage object. However, the conventional processing of IO requests 400, 402, 404, 406 using the plurality of processing cores (e.g., processing cores 410, 412, 414) and the storage object policy (e.g., storage object policy 416) is limited by using static or iterative updates to storage object policy 416. By contrast, implementations of machine learning integration process 10 is able to dynamically update and apply modifications to storage object policy 416 using a machine learning model result generated by a machine learning model in real-time.

In some implementations, machine learning integration process 10 periodically samples 302 the plurality of IO requests from the plurality of processing cores. For example, as part of the processing each IO request (e.g., IO requests 400, 402, 404, 406), several data elements associated with that IO request may be captured. Examples of such elements may include, but are not limited to, the host computing device associated with the IO request; the volume identifier associated with the storage object; the timestamp of the IO request; the command type (e.g., SCSI opcode, such as Read, Write, Copy, Unmap, etc.); the LBA (i.e. offset in the logical address space); and the length of the IO request (for read/write). Machine learning integration process 10 stores this data in a temporary ingest storage container, or tablet, in each relevant processing core. In some implementations, machine learning integration process 10 periodically, e.g. every minute, samples 302, merges and sorts IO requests 400, 402, 404, 406 from all relevant processing cores (e.g., processing cores 410, 412, 414) on a dedicated processing core, based on the particular storage object (e.g., the volume of the IO request), the time of the IO request, and the LBA of the IO request. While an example of periodically sampling every minute has been described, it will be appreciated that any sampling periodicity may be used within the present disclosure.

In some implementations, machine learning integration process 10 generates 314 an analytics storage container using the periodically sampled IO requests. An analytics storage container (e.g., analytics storage container 418) is a portion of storage space where the merged and sorted IO request data is saved in or appended to. In some implementations, the individual ingest tablets of each processing core are then reset. This can also be executed in a distributed and hierarchical manner on a set of dedicated processing cores, performing a final merge and sort on a single processing core.

In some implementations, machine learning integration process 10 generates 304 an IO feature matrix using the periodically sampled IO requests. An IO feature matrix (e.g., IO feature matrix 420) is a representation of the combination of IO feature-related information (e.g., a storage object identifier, an IO feature identifier, historical IO feature values). As will be discussed in greater detail below, an IO feature is a representation of a plurality of IO properties associated with a particular storage object over a period of time. In some implementations, machine learning integration process 10 generates 304 an IO feature matrix by periodically, (e.g., every five minutes), aggregating IO properties from the sampled IO requests and calculating the relevant IO features for each storage object. In some implementations, machine learning integration process 10 generates 316 the IO feature matrix using analytics storage container 418. To perform inference such as classification or regression, a machine learning model needs to have the historical IO feature values for the relevant storage objects in the storage system. The reference period and resolution of the historical data depend on "how far into the future" the machine learning model needs to predict (e.g., predicting the "temperature" (level of activity) of storage objects in the next hour may require an hour of historical data, aggregated at five minute intervals, while identifying long term (e.g., months ahead), storage candidates may require months of historical data, aggregated at weekly intervals). In some implementations, machine learning integration process 10 generates a three-dimensional IO feature matrix using one dimension for a storage object identifier, another dimension for the IO feature identifier, and another dimension for the historical IO feature values.

In some implementations, machine learning integration process 10 provides 306 the IO feature matrix to a machine learning model that is separate from the storage system datapath. A machine learning model (e.g., machine learning model 422) may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. Supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning may generally include a computing device interacting in a dynamic environment in which it must perform a certain goal (such as driving a vehicle or playing a game against an opponent). As it navigates its problem space, the machine learning model is provided feedback that is analogous to rewards, which it tries to maximize. While three examples of machine learning approaches have been provided, it will be appreciated that other machine learning approaches are possible within the scope of the present disclosure. In one example, a random-forest machine learning model may be used due to its generality, simplicity, tunability, and ability to cope with over-fitting. However, it will be appreciated that various machine learning models may be used within the scope of the present disclosure.

In some implementations, the IO feature matrix may be large (e.g., hundreds of megabytes) such that it cannot be passed from the storage system to the machine learning model engine (e.g., machine learning model engine 424) using a typical IPC mechanism. Accordingly, machine learning integration process 10 may pass IO feature matrix 420 to machine learning model engine 424 for processing by a machine learning model (e.g., machine learning model 422) via a shared memory or shared disk address range (e.g., a rolling table). In this example, each time a new set of IO feature values is calculated, it is appended to the end of the table and the oldest set of IO feature values is deleted from the beginning of the table, with the pointer to the table being adjusted.

In some implementations, machine learning integration process 10 generates 308 a machine learning model inference result by processing the IO feature matrix using the machine learning model. For example, machine learning model engine 424 reads IO feature matrix 420 and transforms the data into the appropriate representation for the machine learning model library in use and applies relevant data preprocessing logic (e.g., cleansing and normalization). In some implementations, generating 308 the machine learning model inference result includes generates 318 a plurality of IO features from the IO feature matrix using the machine learning model. As discussed above, an IO feature is a representation of a plurality of IO properties associated with a particular storage object over a period of time. Examples of IO features include a number of IO requests per second (IOPS); a total number of read IO requests; a total number of write IO requests; a percentage of sequential read IO requests; a percentage of sequential write IO requests; an average length of read IO requests; an average length of write IO requests; a standard deviation in read IO request length; a standard deviation in write IO request length; an average arrival rate of any IO request; an average arrival rate for read IO requests; an average arrival rate for write IO requests; an average difference in logical block address (LBA) between IO requests; an average difference in LBA between consecutive read IO requests; an average difference in logical block address (LBA) between consecutive write IO requests; etc.

In some implementations, machine learning integration process 10 generates 318 the plurality of IO features by extracting salient data elements (e.g., one or more IO properties) such as volume ID, timestamp, IO command type (e.g. read, write, unmap, etc.), logical block address (LBA) (i.e., an offset in the data path's thin address space), length, pattern (e.g., sequential, random, caterpillar, IO-stride), etc. from the plurality of sampled IO requests. In this manner, machine learning integration process 10 may extract various IO properties associated with the plurality of IO requests. As will be discussed in greater detail below, the IO properties may include variables associated with the temperature of a storage object. Referring also to FIG. 5 and in some implementations, machine learning integration process 10 may extract one or more IO properties from plurality of IO requests 400. For example, machine learning integration process 10 may extract IO properties 500 from IO request 402; IO properties 502 from IO request 404; IO properties 504 from IO request 406; and IO properties 506 from IO request 408. As discussed above, IO properties 500, 502, 504, 506 are obtained from IO feature matrix 420. From IO properties 500, 502, 504, 506, machine learning integration process 10 may generate a plurality of IO features (e.g., IO features 508, 510, 512, 514).

In some implementations, machine learning model 422 performs the required inference task, (e.g., classification or regression), and stores the machine learning model inference results (e.g., machine learning model inference result 426) in a two-dimensional matrix (e.g., one dimension for a storage object identifier and another dimension for the predicted value). In some implementations, while focus is on inference in the present example, a similar process can be used to train a new machine learning model. However, given the high cost of training a large machine learning model, it is often preferable to build such a machine learning model in a central location (i.e., on a cloud storage system) and distribute the new or updated machine learning model to all relevant storage systems.

In some implementations, machine learning integration process 10 provides 310 the machine learning model inference result to the storage system datapath. For example, machine learning model inference result 426 is sent back to storage system datapath 408 together with metadata related to the machine learning model execution, such as run-time and storage overhead. In some implementations, multiple machine learning models can be executed (e.g., IO "temperature" forecasting for different definitions of temperature), and their results and execution metadata may be used collectively to provide insights to storage system datapath 408.

In some implementations, machine learning integration process 10 executes 312 a storage system policy using the machine learning model inference result. For example, various storage system policies (e.g., storage system policy 416) that are executed on storage system datapath 408 can utilize machine learning model inference results 426 to optimize decision making. In some implementations, executing 312 the storage system policy includes one or more of: forecasting 320 a temperature value for the storage object using the machine learning model and the IO feature matrix; monitoring 322 for a potential ransomware attack on a storage object using the machine learning model and the IO feature matrix; and tiering 324 the storage object in a multi-tiered storage system using the machine learning model and the IO feature matrix. For example, tiering and caching policies in storage system datapath 408 can use the forecasted temperatures for the relevant storage objects (for multiple definitions of temperature) to optimize placement, demotion or promotion decisions, and security policies can utilize accurate risk assessments to detect, block, and recover from potential threats (e.g., ransomware attacks).

In some implementations, machine learning integration process 10 may forecast 320 a temperature value for the storage object using machine learning model 422 and IO feature matrix 420. Forecasting 320 a temperature of a storage object may include generating a temperature value indicative of a likelihood that a storage object will be accessed within a particular time frame. The temperature may incorporate the number of IO requests performed against the storage object, as well as the number of bytes transferred, within the relevant time frame. For example, the temperature value may include a read temperature, a write temperature, and/or a combination of a read and write temperature. That is, a temperature value may indicate a likelihood that data may be read from a storage object and/or that data may be written to a storage object within a particular time frame. In some implementations, the temperature value may be utilized by various tiering or caching policies to optimize the tiering or caching of the storage objects within the storage system. For example, the temperature prediction may enable various tiering or caching policies that use the predicted temperature, along with other values such as the system parameters (e.g., the tiering hierarchy topology, sizes of various layers, etc.), to optimize (up or down) tiering or caching decisions, resulting in a performance gain.

In some implementations, machine learning integration process 10 monitors 322 for a potential ransomware attack on a storage object using machine learning model 422 and IO feature matrix 420. In some implementations, monitoring 322 for a ransomware attack on the storage system in real-time includes using the plurality of IO features to generate a ransomware attack probability score. In some implementations, the ransomware attack probability score is a score ranging from zero to one indicating a probability that a ransomware attack is occurring involving the storage object. In some implementations, ransomware detection process 10 uses the ransomware attack probability score to distinguish normal IO request workloads from potential ransomware attacks.

In some implementations, machine learning integration process 10 tiers 324 the storage object in a multi-tiered storage system using machine learning model 424 and IO feature matrix 420. For example, machine learning model 424 may forecast or predict a temperature value of each storage object, which may be correlated with storage system performance gain if a tiering operation to a particular tier (e.g., up-tiering/promotion to highest tier or down-tiering/demotion to lowest tier) is applied to that storage extent. In this manner, the temperature value may be an indication of a temperature associated with the storage object. For example, if a storage object is accessed more frequently, IO requests for that storage object will be most efficiently processed using a higher performance storage tier. By contrast, if a storage object is accessed infrequently, IO requests for that storage object may be efficiently processed using a lower performance storage tier.

In some implementations, machine learning integration process 10 synchronizes 326 the machine learning model inference result across a pair of storage nodes of the storage system. For example, storage system 12 may use a multi-storage node architecture (e.g., with multiple storage nodes/storage processors). For certain storage configurations, such as active-active, cross-node synchronization is needed to capture the complete IO activity of a storage object. Cross-node synchronization is needed also in an active-passive configuration when a storage object is (logically) migrated between the two storage nodes/storage processors (e.g., due to load balancing), so that the historical IO activity is available on the relevant node. Accordingly, machine learning integration process 10 synchronizes 326 machine learning model inference result 426 across a pair of storage nodes by sending a synchronization message (e.g., synchronization message 428) to another storage node/storage processor. In response to synchronization message 428, another storage node/storage processor may provide a synchronization response with the historical IO activity information associated with a particular storage object that is exclusive to the other storage node/storage processor.

In some implementations, machine learning integration process 10 persists 328 the machine learning model inference result in the storage system. For example, the results of the periodical executions of the different machine learning models (e.g., machine learning model 422) of machine learning model engine 424 are stored in storage system datapath 408 for later reference. In some implementations, machine learning integration process 10 persists 328 machine learning model inference result 426 in data array 112 and/or within storage processor 100.

In some implementations, machine learning integration process 10 provides 330 feedback to the machine learning model. For example, the predictions provided by machine learning model 422 (e.g., machine learning model inference result 426), such as future temperatures of relevant storage objects, can be compared to the actual values measured later on the storage system, in order to improve the learning process and resulting accuracy of machine learning model 422. For this purpose, machine learning integration process 10 provides ongoing feedback to machine learning model 422. In addition to relevant logical data elements (e.g., labels and ground truth), the feedback (e.g., feedback 430) can include hints related to the execution cost of the machine learning model. For example, when storage system 12 is under resource stress, it can ask machine learning model engine 424 to reduce processing by executing simpler and less resource intensive algorithms. Conversely, during idle times, machine learning integration process 10 can give machine learning model engine 424 additional cycles and running time, especially to perform long term predictions such as identifying archival candidates. In this manner, machine learning integration process 10 is able to use feedback 430 to enhance the operation of machine learning model 422 and storage system datapath 408.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   processing a plurality of input/output (IO) requests on a storage object within a storage system datapath using a plurality of processing cores of a storage system;
   periodically sampling the plurality of IO requests from the plurality of processing cores;
   generating an IO feature matrix using the periodically sampled IO requests;
   providing the IO feature matrix to a machine learning model that is separate from the storage system datapath;
   generating a machine learning model inference result by processing the IO feature matrix using the machine learning model;
   providing the machine learning model inference result to the storage system datapath; and
   executing a storage system policy using the machine learning model inference result.

2. The computer-implemented method of claim 1, further comprising:
   generating an analytics storage container using the periodically sampled IO requests; and
   generating the IO feature matrix using the analytics storage container.

3. The computer-implemented method of claim 1, wherein generating the machine learning model inference result includes generating a plurality of IO features from the IO feature matrix using the machine learning model.

4. The computer-implemented method of claim 1, further comprising:
   synchronizing the machine learning model inference result across a pair of storage nodes of the storage system.

5. The computer-implemented method of claim 1, wherein executing the storage system policy includes one or more of:
   forecasting a temperature value for the storage object using the machine learning model and the IO feature matrix;
   monitoring for a potential ransomware attack on a storage object using the machine learning model and the IO feature matrix; and
   tiering the storage object in a multi-tiered storage system using the machine learning model and the IO feature matrix.

6. The computer-implemented method of claim 1, further comprising:
   persisting the machine learning model inference result in the storage system.

7. The computer-implemented method of claim 1, further comprising:
   providing feedback to the machine learning model.

8. A computer program product residing on a non-transitory computer readable medium having a plurality of instructions stored thereon which, when executed by a processor, cause the processor to perform operations comprising:
   processing a plurality of input/output (IO) requests on a storage object within a storage system datapath using a plurality of processing cores of a storage system;
   periodically sampling the plurality of IO requests from the plurality of processing cores;
   generating an IO feature matrix using the periodically sampled IO requests;
   providing the IO feature matrix to a machine learning model that is separate from the storage system datapath;
   generating a machine learning model inference result by processing the IO feature matrix using the machine learning model;
   providing the machine learning model inference result to the storage system datapath; and
   executing a storage system policy using the machine learning model inference result.

9. The computer program product of claim 8, wherein the operations further comprise:
   generating an analytics storage container using the periodically sampled IO requests; and
   generating the IO feature matrix using the analytics storage container.

10. The computer program product of claim 8, wherein generating the machine learning model inference result includes generating a plurality of IO features from the IO feature matrix using the machine learning model.

11. The computer program product of claim 8, wherein the operations further comprise:
    synchronizing the machine learning model inference result across a pair of storage nodes of the storage system.

12. The computer program product of claim 8, wherein executing the storage system policy includes one or more of:
    forecasting a temperature value for the storage object using the machine learning model and the IO feature matrix;
    monitoring for a potential ransomware attack on a storage object using the machine learning model and the IO feature matrix; and
    tiering the storage object in a multi-tiered storage system using the machine learning model and the IO feature matrix.

13. The computer program product of claim 8, wherein the operations further comprise:
    persisting the machine learning model inference result in the storage system.

14. The computer program product of claim 8, wherein the operations further comprise:
    providing feedback to the machine learning model.

15. A computing system comprising:
    a memory; and
    a processor configured to process a plurality of input/output (IO) requests on a storage object within a storage system datapath using a plurality of processing cores of a storage system, wherein the processor is further configured to periodically sample the plurality of IO requests from the plurality of processing cores, wherein the processor is further configured to generate an IO feature matrix using the periodically sampled IO requests, wherein the processor is further configured to provide the IO feature matrix to a machine learning model that is separate from the storage system datapath, wherein the processor is further configured to generate a machine learning model inference result by processing the IO feature matrix using the machine learning model, wherein the processor is further configured to provide the machine learning model inference result to the storage system datapath, and wherein the processor is further configured to execute a storage system policy using the machine learning model inference result.

16. The computing system of claim 15, wherein the processor is further configured to:

generate an analytics storage container using the periodically sampled IO requests; and generate the IO feature matrix using the analytics storage container.

17. The computing system of claim 15, wherein generating the machine learning model inference result includes generating a plurality of IO features from the IO feature matrix using the machine learning model.

18. The computing system of claim 15, wherein the processor is further configured to:

synchronize the machine learning model inference result across a pair of storage nodes of the storage system.

19. The computing system of claim 15, wherein executing the storage system policy includes one or more of:

forecasting a temperature value for the storage object using the machine learning model and the IO feature matrix;

monitoring for a potential ransomware attack on a storage object using the machine learning model and the IO feature matrix; and tiering the storage object in a multi-tiered storage system using the machine learning model and the IO feature matrix.

20. The computing system of claim 15, wherein the processor is further configured to:

persist the machine learning model inference result in the storage system.

* * * * *